(12) United States Patent
Kos et al.

(10) Patent No.: US 6,840,358 B2
(45) Date of Patent: Jan. 11, 2005

(54) FLOATING ROD GUIDE FOR MONOTUBE STRUT

(75) Inventors: Piotr A. Kos, Miamisburg, OH (US); Saiman Lun, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/339,471

(22) Filed: Jan. 9, 2003

(65) Prior Publication Data

US 2004/0134731 A1 Jul. 15, 2004

(51) Int. Cl.[7] .................................................. F16F 9/36
(52) U.S. Cl. ............................. 188/322.17; 188/321.11; 277/352
(58) Field of Search ...................... 188/322.16, 322.17, 188/322.18, 322.19, 321.11, 312, 267.2; 267/220, 221, 129; 277/352, 353, 500, 549; 280/124.147, 124.155

(56) References Cited

U.S. PATENT DOCUMENTS

| | | | | |
|---|---|---|---|---|
| 3,979,134 A | * | 9/1976 | Keijzer et al. | ........ 280/124.154 |
| 5,178,243 A | * | 1/1993 | Hamada et al. | ........ 188/322.17 |
| 5,363,945 A | * | 11/1994 | Lizell et al. | ................ 188/281 |
| 5,531,299 A | * | 7/1996 | Bataille | .................. 188/322.17 |
| 5,984,060 A | | 11/1999 | Clark et al. | |
| 6,318,526 B1 | * | 11/2001 | Kruckemeyer et al. | 188/322.17 |
| 6,390,258 B1 | | 5/2002 | Hofmann et al. | |
| 6,454,060 B1 | | 9/2002 | Lisenker et al. | |
| 6,510,930 B2 | | 1/2003 | Kime | |
| 6,640,943 B1 | * | 11/2003 | Daws et al. | ........... 188/322.17 |

* cited by examiner

Primary Examiner—Pam Rodriguez
(74) Attorney, Agent, or Firm—Michael D. Smith

(57) ABSTRACT

A motor vehicle strut and a rod guide assembly for the same. The strut includes a body, a rod slidable within the body, and a guide assembly. The guide assembly includes a housing assembly with a compliant member positioned adjacent a sleeve. An aperture is formed within the housing assembly. A bearing receives the rod, is positioned substantially within the aperture, and engages the sleeve. At least one seal is positioned substantially within the aperture. A seal cover and a retainer are operably attached to the housing assembly. Lateral movement of the rod causes deformation of the compliant member.

18 Claims, 3 Drawing Sheets

FLOATING ROD GUIDE FOR MONOTUBE STRUT

TECHNICAL FIELD OF THE INVENTION

The present invention relates to monotube strut assemblies, and more particularly to a floating rod guide for a monotube strut.

BACKGROUND OF THE INVENTION

A strut is a type of damper that is used in vehicle suspensions as both a damping device for providing shock absorbing functions and as part of the suspension's load-bearing structure. Monotube gas-charged dampers are known wherein a piston with a connected piston rod is slidably carried in a fluid-filled tube with a separate piston called a gas cup slidably carried in the tube on an opposite side of the piston from the rod. The gas cup separates a compressible gas charge from the fluid within the damper. It is known that monotube gas-charged dampers exhibit desirable performance characteristics when used in some suspension assemblies.

Typically, the generic monotube strut design configuration is produced primarily as an aftermarket replacement damper, although limited original equipment (OEM) applications have been implemented. The prior art device generally includes a bearing mechanism that includes a combination of a polytetrafluoroethelyne laminated plain bearing and a grease lubricant. In some applications performance advantages of high pressure monotube dampers are well known and therefore, the use of such devices without restriction would be desirable. However, in applying a monotube gas-charged strut in an OEM application, extended durability requirements may lead to restrictions in the use of such devices, particularly in applications involving larger and heavier vehicles that operate with resultant increased side-loading. In particular, such a strut must be assembled and maintained in a straight and true line otherwise, misalignment may lead to premature rod wear and high damper axial friction. Accordingly, it would be desirable to provide a strategy for minimizing rod wear and damper axial friction due to misalignment in a monotube strut.

One strategy developed for minimizing rod wear and damper axial friction in a monotube strut is disclosed in U.S. Pat. No. 6,390,258 to Hofmann et al., which is incorporated by reference herein. The Hofmann patent teaches a floating rod guide assembly including a rod guide, a seal cover, and a retainer. A first O-ring is disposed between the seal cover and the rod guide, and a second O-ring is disposed between the rod guide and the retainer. During operation, a damper rod slides within a passageway provided in the guide assembly. The guide assembly may reduce friction levels and incidence of premature rod wear by compensating for side-load forces exerted on the strut.

Although the guide assembly may effectively reduce friction levels and incidence of premature rod wear with larger side-loads, some wear may occur with smaller side-loads. The prior art strut typically requires that a sufficient side-load is exerted on the assembly to overcome static friction forces associated with the O-rings. Unless the static friction forces are overcome, the rod guide is not free to move laterally to compensate for the smaller side-loads. This may cause binding contact of the piston with other surfaces thereby resulting in premature wear and failure. Accordingly, it would be desirable to provide a floating rod guide that can compensate for smaller side-loads.

Therefore, it would be desirable to provide a floating rod guide that overcomes the aforementioned and other disadvantages.

SUMMARY OF THE INVENTION

A first aspect of the present invention provides a guide assembly for a rod of a motor vehicle strut. The guide assembly includes a housing assembly with a compliant member positioned adjacent a sleeve. A bearing receives the rod, is positioned substantially within the aperture, and engages the sleeve. At least one seal is positioned substantially within the aperture. A seal cover and a retainer are operably attached to the housing assembly. Lateral movement of the rod causes deformation of the compliant member.

A second aspect of the present invention provides a strut for a motor vehicle. The strut includes a body, a rod slidable within the body, and a guide assembly. The guide assembly includes the aforementioned features and functions described in the first aspect of the invention.

A third aspect of the present invention provides a guide assembly for a rod of a motor vehicle strut. The guide assembly includes housing means and means for slidably receiving the rod within the housing means. The guide assembly further includes means for providing lateral movement of the rod within the housing means and means for sealing the rod.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PRESENTLY PREFERRED EMBODIMENTS

Figure 1:
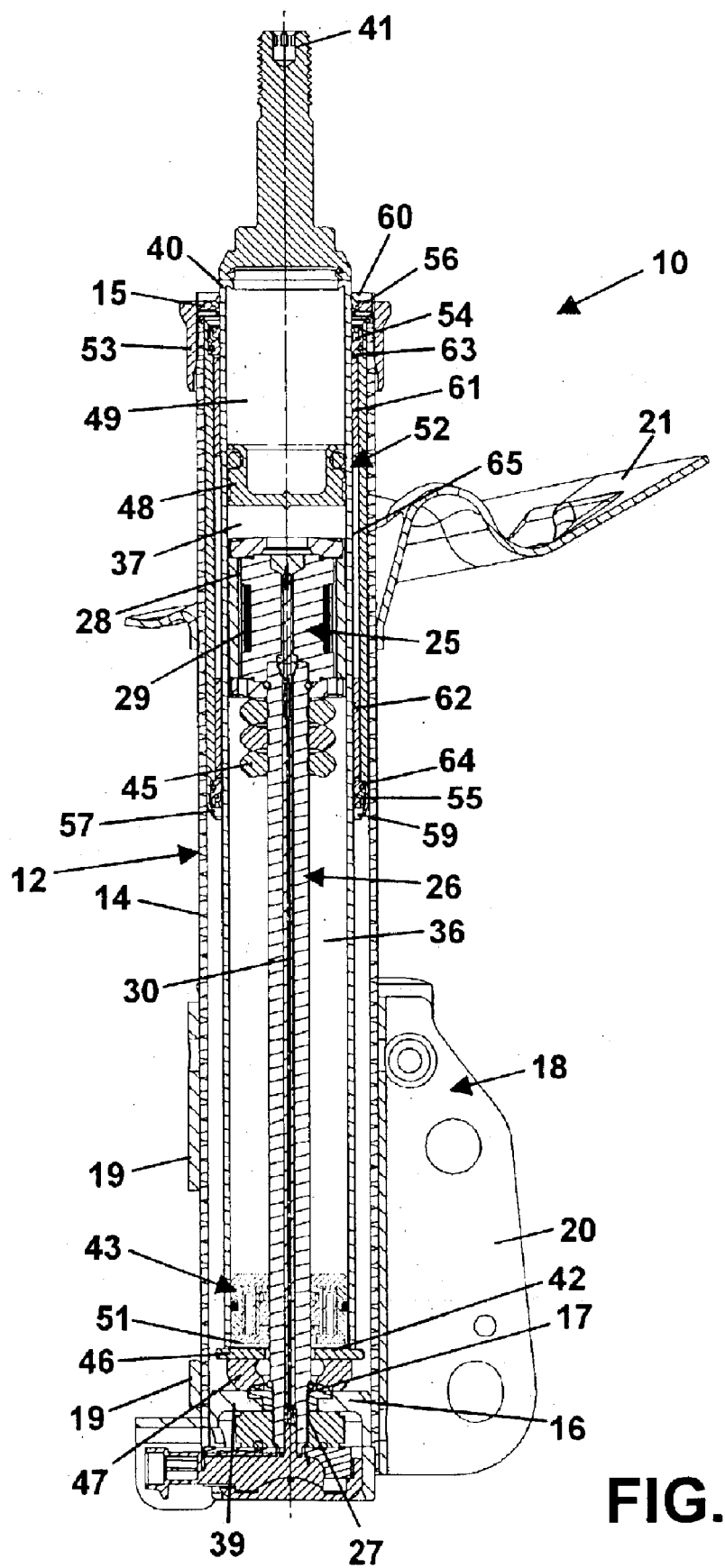
FIG. 1 is a cross-sectional view of a monotube strut including a rod guide assembly in accordance with the present invention.

Referring to the drawings, wherein like reference numerals refer to like elements, FIG. 1 is a cross-sectional view of a monotube strut made in accordance with the present invention and shown generally by numeral 10. Those skilled in the art will recognize that the strut 10 may include a number of alternate damper designs and may be employed in a variety of applications. In the present description, the strut 10 is shown and described as a linear acting fluid magnetorheological (MR) damper for generating dampening forces in a motor vehicle suspension system.

Strut 10 includes a body 12 that may include a housing tube 14 with an open end 15 and a closed end 16 that may be formed by a spin closing operation, or by welding or otherwise securing a secondary component 39 to the housing tube 14. Closed end 16 may include an opening 17. A mounting bracket 18 may include a cylindrical body 19 that is closely received over the housing tube 14 near closed end 16 and may be secured in position by a suitable means such as welding. Bracket 18 may include a pair of arms 20 that exhibit suitable openings for connection to the unsprung mass of the vehicle at a location such as the steering knuckle (not illustrated). A spring seat 21 may be received on the housing tube 14 and located in position as required by the particular application within which the strut 10 will operate. Spring seat 21 may be fixed in position on the housing tube 14 by a suitable means such as welding. Further details of the housing tube are described in U.S. Pat. No. 5,984,060, the disclosure of which is hereby incorporated by reference.

A piston assembly 25 may be slidably positioned within the housing tube 14 and connected to a piston rod 26. Piston rod 26 may extend through the opening 17 and include a threaded portion 27 for attachment to the housing tube 14. Piston assembly 25 may include an annular gap 28 having a substantially circular ring cross-sectional shape to allow fluid to pass therethrough. Piston assembly 25 may include a coil 29 for generating an electromagnetic field within a portion of the annular gap 28. Coil 29 may include one or more conductive elements, such as a metallic wire, for carrying an electric current. An electrical conductor 30 may extend through the piston rod 26 for providing electrical current to the coil 29 from an external power source (not shown). The electric current may be provided and controlled externally (e.g., by an electrical source and vehicle computer system) to dynamically regulate dampening forces. Specifically, the magnetic field generated by the coil 29 excites a transformation of MR fluids to a state that exhibits increased damping force (i.e., the MR fluid viscosity is increased). The dampening force is thus proportional to the amount of current run through the coil 29.

A damper body tube 40 may be slidable received about the piston assembly 25. Damper body tube 40 may include a first end 41 at an outboard position adapted to be connected to the sprung mass of the vehicle and include a second end 42 at an inboard position. Second end 42 may be supported about the piston rod 26 by a floating rod guide assembly 43 that is fixed in position within the damper body tube 40. The upper end of the rod guide assembly 43 may be adapted to contact a rebound stop that includes one or more, in this case three, elastomeric bushings 45 carried adjacent the piston assembly 25. At maximum extension of the strut 10, the bushings 45 may be compressed against the upper end of the rod guide assembly 43 to cushion the deceleration of strut 10. A plate 46 may be carried near the rod guide assembly 43 by a bracket 51 positioned adjacent the end 42 of damper body tube 40. Plate 46 may be adapted to contact a jounce bumper 47 that includes an elastomeric bushing and is positioned against the closed end 16 of housing tube 14 and about the piston rod 26.

A gas cup 48 may be carried in the damper body tube 40 between the piston assembly 25 and the end 41. Gas cup 48 may carry a seal and slide along the inside of damper body tube 40 separating a compensation chamber 49 from the compression chamber 37. Extension chamber 36 and compression chamber 37 may carry a supply of hydraulic fluid, such as MR fluid. Compensation chamber 49 may carry a compressible fluid, such as nitrogen gas. During extension and compression directed travel of the damper body tube 40 relative to the piston assembly 25, a decreasing or an increasing volume of the piston rod 26 may be contained within the damper body tube 40 depending on the stroke position of the strut assembly 10. In order to compensate for this varying volumetric amount of the piston rod 26 within the fluid-filled chambers 36, 37, the gas cup 48 slides compressing or expanding the compensation chamber 49.

Damper body tube 40 may be supported within the housing tube 14 by a bearing system 52 that is designed to reduce friction and improve durability of the strut 10. Bearing system 52 may include a bearing sleeve 53 manufactured from a material such as steel and may include a step 54 formed near its outboard end 56 and a step 55 formed near its inboard end 57. Bearing sleeve 53 may be slip-fit within the housing tube 14 near end 15. Bearing sleeve 53 may be maintained in position by a formed stop 59 at end 57, and by a retaining cap 60 at end 56 that is pressed onto the end of housing tube 14. Stop 59 may be formed by a means such as roll-forming or dimpling.

Bearing assembly 52 may also includes a pair of plain bearings 61 and 62 that are pressed into the bearing sleeve 53 with the bearing 61 positioned near end 56 and the bearing 62 positioned near end 57. A seal 63 may be positioned against the step 54 and bear against the damper body tube 40. A seal 64 may be positioned against the step 55 and bear against the damper body tube 40. This provides a fluid-tight chamber 65 between the bearings 61, 62, which may be filled with oil. The oil in chamber 65 may be in a fluid form at room temperature and is preferably comprised of a formulated synthetic hydrocarbon based polyalphaolefinic bearing oil. This preferred oil is selected because it provides the film strength of natural paraffinic petroleum oil with improved performance in the areas of volatility, temperature, operating range, and viscosity stability.

Body 12, housing tube 14, damper body tube 40, piston rod 26, and portions thereof may be manufactured from a variety of sufficiently rigid material(s) such as steel, aluminum, metal, metal alloy, composites, and the like. Piston assembly 25 may be formed from low-carbon steel. Low-carbon steel materials typically provide electromagnetic induction properties compatible with MR fluids. Those skilled in the art will recognize that the design and nature of the constituent materials of the strut 10 may vary without limiting the operation of the present invention.

Figure 2:
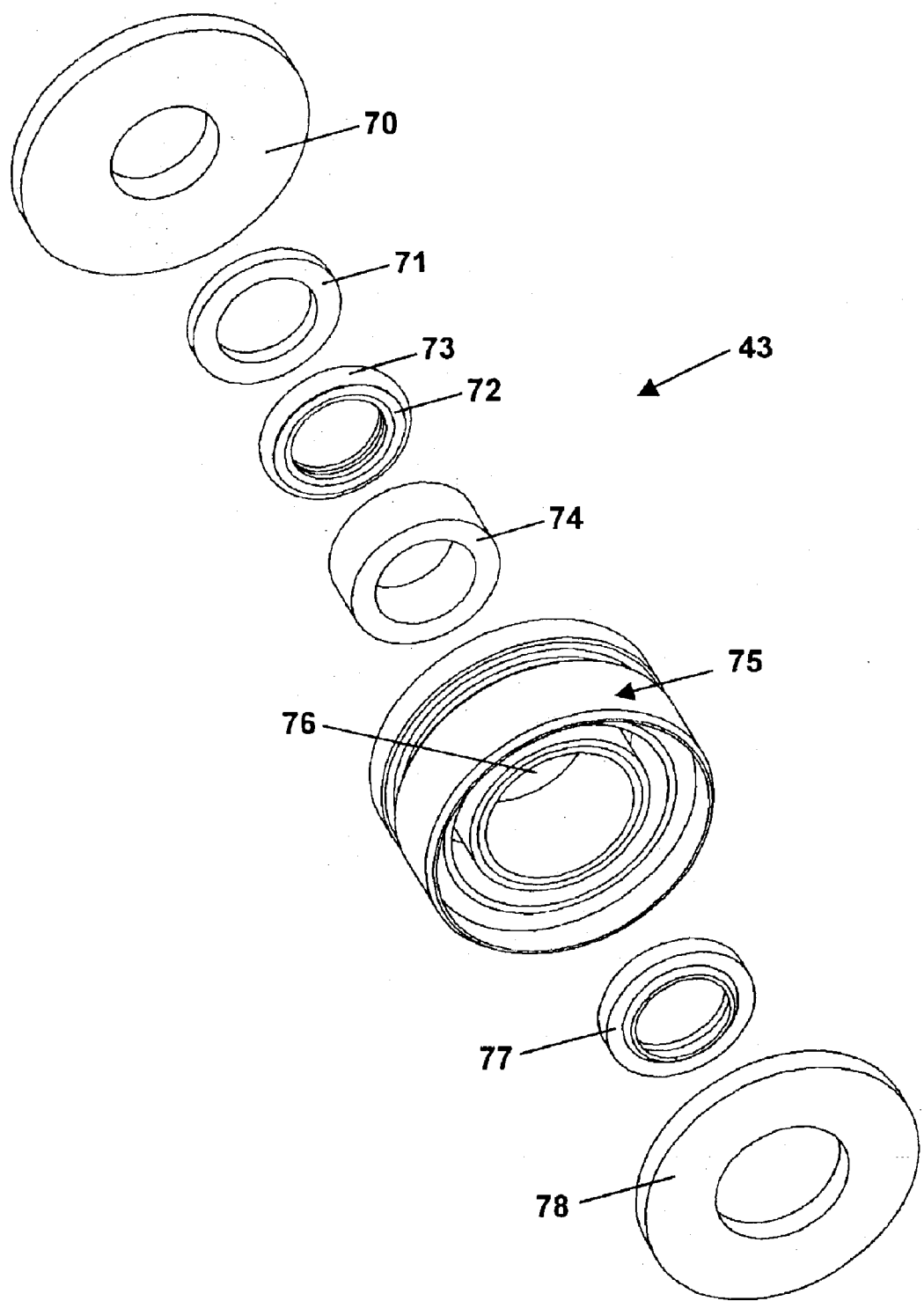
FIG. 2 is an exploded view of the rod guide assembly shown in FIG. 1.

FIG. 2 is an exploded view of the rod guide assembly 43. In one embodiment, the rod guide assembly 43 may include a seal cover 70, a retaining ring 71, a fluid seal 72 including an energizer 73, a low-friction bearing 74, a housing assembly 75 including an aperture 76 formed therein, a scraper seal 77, and a retainer 78. In another embodiment, as for use with low temperature damper applications, the scraper seal 77 may be omitted to reduce part number and assembly cost. Those skilled in the art will recognize that rod guide assembly parts and manner in which they are configured may vary while providing the advantages of the present invention.

Figure 3:
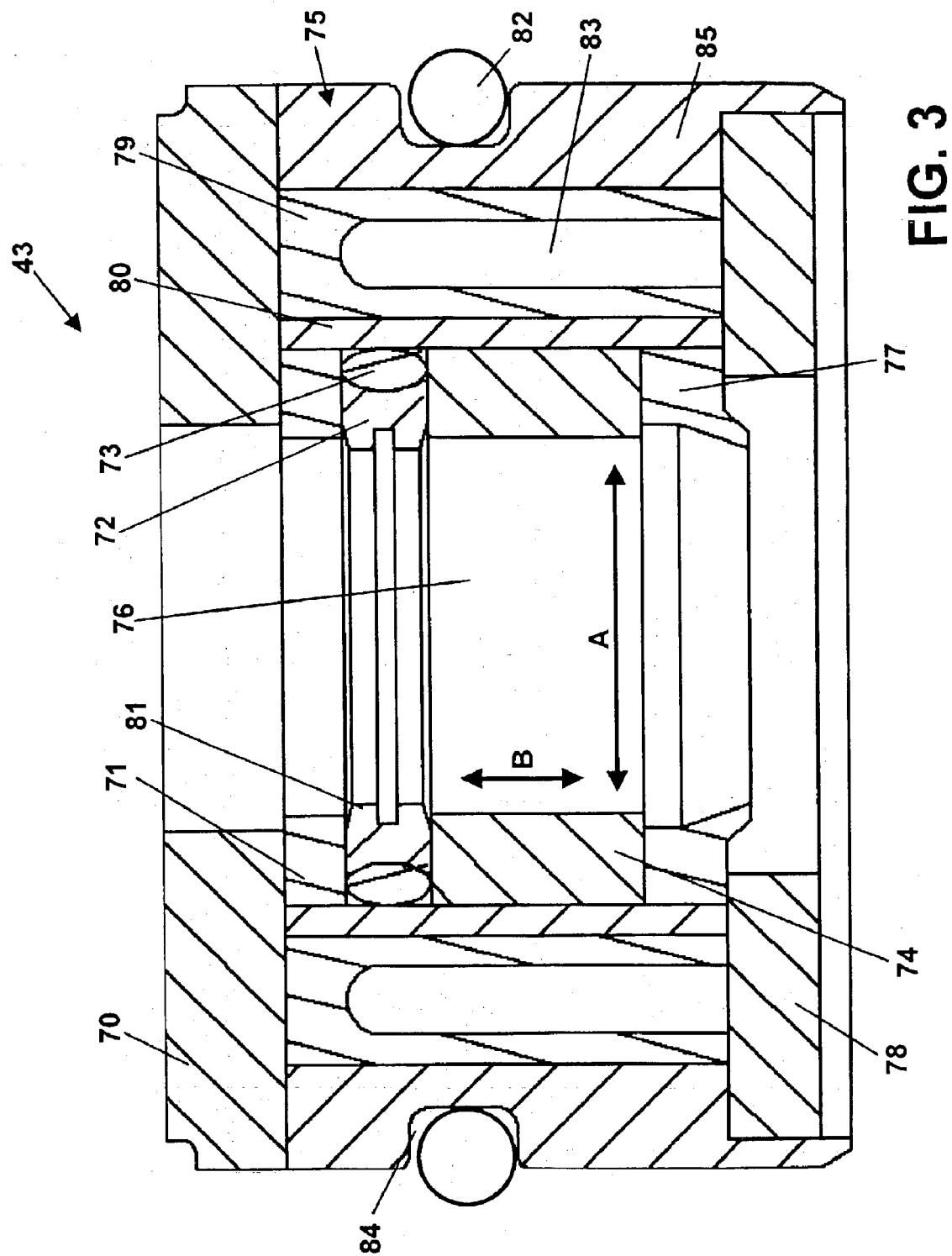
FIG. 3 is a detailed cross-sectional view of the rod guide assembly shown in FIG. 1.

FIG. 3 is a detailed cross-sectional view of the rod guide assembly 43 shown assembled. Housing assembly 75 includes an outer housing 85 with a compliant member 79 positioned adjacent a sleeve 80. Compliant member 79 maybe manufactured from a resilient material such as rubber, plastic, acrylic, silicone, vinyl, urethane, and the like. In one embodiment, the compliant member 79 material is a rubber bonded to the outer housing 85 and the sleeve 80 and is compatible with the damper conditions (e.g., high temperature and pressure) and the fluid type. Compliant member 79 may include an annular opening 83 in which fluid is carried. The annular opening 83 allows the compliant member 79 to compress and expand laterally (i.e., along arrows A). Fluid may move out of and into the annular opening 83 as the compliant member 79 compresses and expands, respectively.

Bearing 74 is positioned within the aperture 76, receives the piston rod 26 (as shown in FIG. 1), and engages the sleeve 80. Bearing 74 may be manufactured from a low-friction material such as Teflon, plastic, steel, aluminum, metal, metal alloy, and the like. The bearing 74 material preferably allows the piston rod 26 (as shown in FIG. 1) to slide axially (i.e., along arrows B) with minimal friction. In one embodiment, the bearing 74 may be manufactured from steel, plated with Teflon impregnated nickel for reduced sliding friction and improved corrosion resistance.

Fluid seal 72 and scraper seal 77 are positioned within the aperture 76. Fluid seal 72 may be positioned between the retaining ring 71 and the bearing 74. Scraper seal 77 may be positioned between the bearing 74 and the retainer 78. Fluid seal 72 and scraper seal 77 may be adapted to engage the piston rod 26 and prevent the ingress of MR fluid particles, thus lessening axial friction and promoting the lifetime of the part. Energizer 73 may provide a biasing force against the fluid seal 72 causing projections 81 to effectively engage the piston rod 26. Seal cover 70 and a retainer 78 are operably attached to the housing assembly 75 and may retain the bearing 74 and seals 72, 77 within the aperture 76. A static O-ring 82 may be disposed within an outer groove 84 of the housing assembly 75. O-ring 82 creates a seal between the outside of the housing assembly 75 and the inside of the damper body tube 40.

When a side-load is exerted on the strut 10, the piston rod 26 may move laterally causing the bearing 74 and sleeve 80 to move in the same direction. As the sleeve 80 moves laterally, the compliant member 79 is deformed (e.g., expand and compress) thereby allowing a lateral range of motion for the bearing 74 and sleeve 80. Accordingly, the bearing 74 and sleeve 80 are able to move in accordance with the piston rod 26 thereby compensating for lateral movement of the piston rod 26 produced by side-loads. The bearing 74 and sleeve 80 are able to move laterally with relative ease (i.e., only having to overcome relatively small static friction forces) thereby allowing the rod guide assembly 43 to better compensate for smaller side-loads. As such, binding contact of the piston assembly 25 with the damper body tube 40 and unnecessary strut 10 wear may be prevented.

While the embodiments of the invention disclosed herein are presently considered to be preferred, various changes and modifications can be made without departing from the spirit and scope of the invention. For example, the strut and rod guide assembly are not limited to any particular design, configuration, or arrangement. The housing assembly, bearing, seals, seal cover and retainer configuration, size, shape, geometry, location, orientation, and number, may vary without limiting the utility of the invention. Furthermore, the strut and rod guide assembly are not limited to MR-type monotube dampers. Those skilled in the art will recognize that the invention may be adapted for numerous damper types.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A guide assembly for a rod of a motor vehicle strut, the guide assembly comprising:
   a housing assembly including a compliant member positioned adjacent a sleeve, the housing assembly including an aperture formed therein; wherein the compliant member defines at least one opening formed therein for carrying a fluid;
   a bearing for receiving the rod, the bearing positioned substantially within the aperture and engaging the sleeve;
   at least one seal positioned substantially within the aperture; and
   a seal cover and a retainer operably attached to the housing assembly; wherein lateral movement of the rod causes deformation of the compliant member.

2. The guide assembly of claim 1 wherein the seal comprises a scraper seal for engaging the rod of the motor vehicle strut.

3. The guide assembly of claim 1 wherein the seal comprises a fluid seal including an energizer, the fluid seal for engaging the rod of the motor vehicle strut.

4. The guide assembly of claim 1 wherein the compliant member comprises a resilient material.

5. The guide assembly of claim 4 wherein the resilient material comprises at least one material selected from a group consisting of rubber, plastic, acrylic, silicone, vinyl, and urethane.

6. The guide assembly of claim 1 wherein the bearing comprises a low-friction material.

7. The guide assembly of claim 6 wherein the low-friction material comprises at least one material selected from a group consisting of Teflon, plastic, steel, aluminum, metal, and metal alloy.

8. The guide assembly of claim 1 further comprising a retaining ring operably attached to the housing assembly.

9. The guide assembly of claim 1 further comprising an O-ring disposed adjacent an outer groove of the housing assembly.

10. A strut for a motor vehicle, the strut comprising:
    a body;
    a rod slidable within the body; and
    a guide assembly including:
       a housing assembly including a compliant member positioned adjacent a sleeve, the housing assembly including an aperture formed therein; wherein the compliant member defines at least one opening formed therein for carrying a fluid;
       a bearing for receiving the rod, the bearing positioned substantially within the aperture and engaging the sleeve;
       at least one seal positioned substantially within the aperture; and
       a seal cover and a retainer operably attached to the housing assembly; wherein lateral movement of the rod causes deformation of the compliant member.

11. The strut of claim 10 wherein the seal comprises a scraper seal for engaging the rod of the motor vehicle strut.

12. The strut of claim 10 wherein the seal comprises a fluid seal including an energizer, the fluid seal for engaging the rod of the motor vehicle strut.

13. The strut of claim 10 wherein the compliant member comprises a resilient material.

14. The strut of claim 13 wherein the resilient material comprises at least one material selected from a group consisting of rubber, plastic, acrylic, silicone, vinyl, and urethane.

15. The strut of claim 10 wherein the bearing comprises a low-friction material.

16. The strut of claim 15 wherein the low-friction material comprises at least one material selected from a group consisting of Teflon, plastic, steel, aluminum, metal, and metal alloy.

17. The strut of claim 10 further comprising a retaining ring operably attached to the housing assembly.

18. The strut of claim 10 further comprising an O-ring disposed adjacent an outer groove of the housing assembly.

* * * * *